US006732220B2

(12) United States Patent
Babaian et al.

(10) Patent No.: US 6,732,220 B2
(45) Date of Patent: May 4, 2004

(54) METHOD FOR EMULATING HARDWARE FEATURES OF A FOREIGN ARCHITECTURE IN A HOST OPERATING SYSTEM ENVIRONMENT

(75) Inventors: Boris A. Babaian, Moscow (RU); Roman A. Khvatov, Khimky (RU)

(73) Assignee: Elbrus International, George Town Grand Cayman (KY)

( * ) Notice: Subject to any disclaimer, the term of this patent is extended or adjusted under 35 U.S.C. 154(b) by 543 days.

(21) Appl. No.: 09/838,530

(22) Filed: Apr. 18, 2001

(65) Prior Publication Data

US 2002/0029308 A1 Mar. 7, 2002

Related U.S. Application Data

(63) Continuation-in-part of application No. 09/505,652, filed on Feb. 17, 2000.
(60) Provisional application No. 60/120,348, filed on Feb. 17, 1999, provisional application No. 60/120,376, filed on Feb. 17, 1999, provisional application No. 60/120,380, filed on Feb. 17, 1999, provisional application No. 60/120,457, filed on Feb. 17, 1999, provisional application No. 60/120,458, filed on Feb. 17, 1999, provisional application No. 60/120,459, filed on Feb. 17, 1999, and provisional application No. 60/120,504, filed on Feb. 17, 1999.

(51) Int. Cl.[7] .............................................. G06F 12/00
(52) U.S. Cl. ....................... 711/6; 711/203; 717/136; 717/138
(58) Field of Search .................. 711/6, 202–203; 709/1; 703/27; 712/208; 714/1; 717/136–138

(56) References Cited

U.S. PATENT DOCUMENTS

| | | | | |
|---|---|---|---|---|
| 5,553,291 A | * | 9/1996 | Tanaka et al. | 709/1 |
| 5,761,477 A | * | 6/1998 | Wahbe et al. | 709/1 |
| 5,930,509 A | | 7/1999 | Yates et al. | |
| 5,958,061 A | * | 9/1999 | Kelly et al. | 714/1 |
| 6,075,938 A | * | 6/2000 | Bugnion et al. | 703/27 |
| 6,105,124 A | * | 8/2000 | Farber et al. | 712/208 |
| 6,253,224 B1 | * | 6/2001 | Brice et al. | 709/1 |

OTHER PUBLICATIONS

Sites, Richard L., et al., "Binary Translation," Communications of the ACM, Feb. 1993, vol. 36, No. 2, pp. 69–81.
Dobberpuhl, Daniel, et al., "Design of EV–4," Communications of the ACM, Feb. 1993, vol. 36, No. 2, p. 82. (one–page—stapled to back of Cite AD above).
Diefendorff, Keith, "The Russians are Coming—Supercomputer Maker Elbrus Seeks to Join x86/1A–64 Melee," Microprocessor Report, Feb. 15, 1999, vol. 13, No. 2, pp. 1–7.
Silberman, Gabriel M., et al., "An Architectural Framework for Supporting Heterogeneous Instruction–Set Architectures," Computer, Jun. 1993, vol. 26, No. 6, pp. 39–56.
Rivest, Ronald L., "The MD5 Message–Digest Algorithm," Memo, Network Working Group, MIT Laboratory for Computer Science and RSA Data Security, Inc., Apr. 1992, 21 pages.

* cited by examiner

*Primary Examiner*—Nasser Moazzami
(74) *Attorney, Agent, or Firm*—Townsend and Townsend and Crew LLP

(57) ABSTRACT

The present invention relates to a computer system adapted to efficiently execute binary translated code. In accordance with the present invention, foreign code is stored in a foreign virtual memory space, translated to acquire binary translated code, which is stored in a host virtual memory space and then executed. The host computer system isolates each virtual memory configuration into separate processes referred to as a virtual machine while enabling multiple virtual machines to exist simultaneously. Execution may switch from one virtual machine to another merely by switching to a new page table, where each page table describes the memory configuration of a virtual machine. Common system level resources are shared by the virtual machines under the control of a virtual memory manager.

22 Claims, 3 Drawing Sheets

METHOD FOR EMULATING HARDWARE FEATURES OF A FOREIGN ARCHITECTURE IN A HOST OPERATING SYSTEM ENVIRONMENT

CLAIM OF PRIORITY

This Continuation-in-part application claims priority from co-pending U.S. patent application Ser. No. 09/505,652, filed Feb. 17, 2000, entitled "System for Improving Translation of Software from a Native Computer Platform to a Target Computer Platform," which is a non-provisional of U.S. Provisional Patent Application Nos. 60/120,348, 60/120,376, 60/120,380, 60/120,457, 60/120,458, 60/120,459, and 60/120,504, all filed Feb. 17, 1999; each of which is incorporated herein by reference as if set forth in fall in this document.

CROSS REFERENCES TO RELATED APPLICATIONS

This Continuation-in-part application is related to co-pending U.S. patent application Ser. No. 09/838,552, filed Apr. 18, 2001, entitled "Method and Apparatus for Preserving Precise Exceptions in Binary Translated Code"; U.S. patent application Ser. No. 09/838,532, filed Apr. 18, 2001, entitled "Method for Fast Execution of Translated Binary Code Utilizing Database Cache for Low-Level Code," Correspondence"; and U.S. patent application Ser. No. 09/838,550, filed Apr. 18, 2001, entitled "Method for Effective Binary Translation Between Different Instruction Sets Using Emulated Supervisor Flag and Multiple Page Tables", each of which is incorporated herein by reference as if set forth in full in this document.

BACKGROUND OF THE INVENTION

Often it is desirable to use a computer system to execute software written for a different type of computer system. For example, the owner of a new computer system may desire to execute legacy software written for their older, obsolete computer system. Often this software, which may include both application and operating system software, is in the form of compiled binary code. This code, referred to as foreign binary code, must be translated so that it will correctly execute notwithstanding the architectural differences between the new computer, referred to as the host computer system, and the obsolete computer system, referred to as the foreign computer system.

There are two well-known processes for enabling the execution of legacy software on the host system: porting and binary translation. Software porting requires access to legacy source code. This legacy source code is compiled into host code that will correctly execute on the host computer system. While it is possible to port software, it is a difficult task that requires a complete understanding of both the legacy architecture and the new host architecture. Further, there are times where the source code, the human readable version of the legacy software, is not available. Without source code, it is nearly impossible to accurately port legacy software to a new host architecture.

Binary translation, on the other hand, does not require access to legacy source code. Instead, foreign binary code is translated into code that executes on the host computer system. During the translation process, each instruction of foreign code is translated to a corresponding instruction (or sequence of instructions) that when executed by the host computer achieves the same result as if the foreign code were executed by the foreign computer system. This translated code is referred to herein as binary translated code. Various binary translation techniques are known in the art.

To improve performance and efficiency of the binary translated code, the concept of a virtual processor is also known. Virtual processors, such as the E2K designed by Elbrus International and the Crusoe designed by Transmeta Corp., are based on a flexible architecture that incorporates both hardware and software layers to achieve certain functions provided by the foreign computer system. With virtual processors, the architecture upon which the host computer system is based is completely hidden from the user. However, notwithstanding the advantages provided by virtual processors, improvements are necessary to minimize delays or other artifacts that may arise from the translation process and execution of binary translated code.

One significant problem in achieving effective binary translation arises each time the host computer accesses memory. For example, when the foreign memory structure uses page tables to correlate a logical address to a physical memory location, significant time is required to traverse the foreign page tables and determine the correct physical memory location for each memory access. Further complicating the process of accessing memory arises because many computer systems utilize virtual memory to maximize perceived memory while minimizing the actual amount of expensive random access memory. In such systems, page tables are used to translate a logical address to a physical address. When only one page table is supported, only one corresponding virtual memory can be described and supported. However, when the legacy operating system emulates multiple page tables, the operating system must be able to switch a requested page table on demand. This switching process adds inherent delay because the switching is typically accomplished by reloading a set of registers that points to the image of the page table stored in memory. When executing foreign code on the host processor, the binary translation process detects the existence of emulated page tables. However, what is needed is a method to improve execution whenever operation switches from one emulated page table to another.

SUMMARY OF THE INVENTION

The present invention relates to a microprocessor based computer system (or "platform") that is adapted to efficiently execute binary translated code. In accordance with the present invention, foreign code is translated and executed by a host processor. If the foreign computer system supports multiple page tables, the binary translation process detects a switch from one page table to another. Advantageously, the host computer system isolates each virtual memory configuration described by the page table into separate processes in virtual memory space. When execution switches from one page table to another, there is no need for registers to be purged and updated with new data.

In one preferred embodiment, the host computer system maintains foreign code and data in a foreign virtual space. Host code and translation processes are maintained in a separate host virtual space. Virtual spaces are linear logical memory spaces used by the host processor to access data and instructions (computer code). A memory management unit (MMU) maps the virtual spaces to physical memory in hardware to eliminate time consuming virtual to physical address translation when executing binary compiled host code. When the computer system detects a request to switch to a different foreign virtual space it is interpreted as a switch to new virtual machine. When a switch occurs, there is no need to reconfigure memory contents or registers as execution merely switches to a new virtual space.

Other features and advantages of the invention will be apparent in view of the following detailed description and appended drawings.

DESCRIPTION OF SPECIFIC EMBODIMENTS

Figure 1:
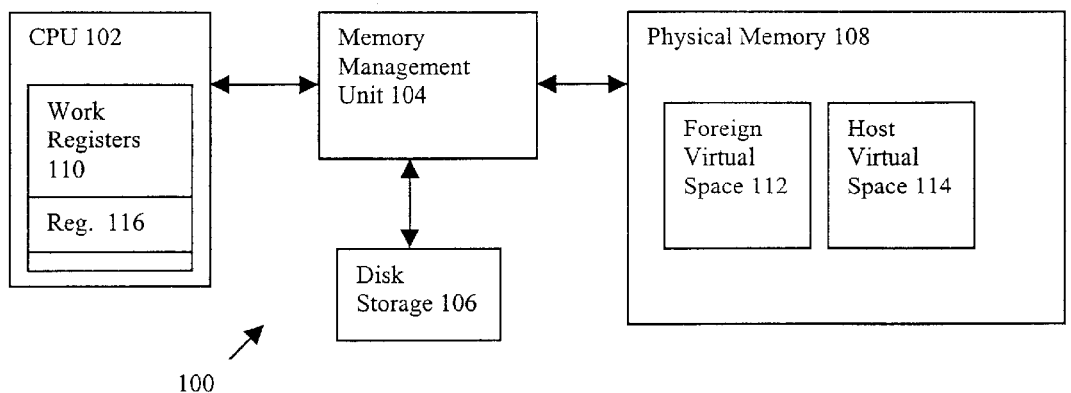
FIG. 1 illustrates a representative embodiment of a host computer system.

The present invention relates to an apparatus and method for executing foreign binary code on a host computer. More particularly, the present invention relates to an improved apparatus and method for efficiently executing foreign code on a host system in real time. In the following description of preferred embodiments, reference is made to the accompanying drawings that form a part hereof, and in which is shown by way of illustration a specific embodiment in which the invention may be practiced. It is to be understood that other embodiments may be utilized and that changes may be made without departing from the scope of the present invention. For purposes of illustration, the following description describes the present invention as used with computer systems based, in general, on a RISC-based processor. However, it is contemplated that the present invention can also be used as a part of computer systems having multiple such processors or having CISC-based processors. It will also be apparent to one skilled in the art that the present invention may be practiced without the specific details disclosed herein. In other instances, well-known structures and techniques associated with the described processor or computer system have not been shown or discussed in detail to avoid unnecessarily obscuring the present invention. Reference will now be made in detail to the preferred embodiments of the invention, examples of which are illustrated in the accompanying drawings. Wherever possible, the same reference numbers will be used throughout in the drawings to refer to the same or like components.

Referring now to FIG. 1, a host computer system 100 is illustrated. Host computer system 100 comprises a central processing unit (CPU) 102, a memory management unit (MMU) 104 and a storage device such as disk drive 106 coupled together by communication buses. MMU 104 is further coupled to physical memory 108 that may include both random access memory (RAM) and non-volatile memory. Host CPU 102 manages the process of translating foreign code into host code and executing the host code. In one preferred embodiment host CPU 102 is the E2k microprocessor designed by Elbrus International, the assignee of the present invention. Host CPU 102 includes a set of work registers 110 that can be dynamically renamed so that both a foreign and a host register set can be maintained during execution of foreign code. MMU 104 includes logic to form and maintain a foreign virtual space 112 and a host virtual space 114 in physical system memory 108. MMU 104 includes a translation lookaside buffer (TLB) to manage coherence between foreign code in foreign virtual space 112 and translated binary code in host virtual space 114.

In accordance with the present invention, host computer system 100 transfers foreign binary code into foreign virtual space 112 and then translates the foreign binary code into host code, also referred to as translated binary code. The corresponding translated binary code is stored in host virtual memory 114. As used herein, foreign binary code means computer instructions (for example, compiled foreign operating system and application code) intended for execution by foreign computer system. The foreign computer system may be based on an Intel x86 processor, a Motorola 68xxx processor or a Sun Sparc processor by way of example.

To minimize performance penalties associated with executing translated binary code, host CPU 102 maintains the same data representation and processing logic as in the foreign architecture. A portion of work registers 110 is allocated for use as foreign registers and a portion for use as host registers. Since many foreign computer systems utilize virtual memory to maximize perceived memory while minimizing the need for expensive random access memory (such as DRAM or SRAM), page tables are used to translate a logical address in virtual memory to a physical address in host physical memory. When the foreign computer system only supports one page table, only one corresponding virtual memory can be described and supported.

It will be appreciated that foreign virtual memory corresponds to a foreign virtual machine. Thus, if more than one virtual memory is supported by the foreign computer system, the host system will treat each such virtual memory as a foreign virtual machine where a virtual machine is a logical process that operates using physical components of the computer system. If the foreign operating system supports more than one active foreign virtual machine, the foreign operating system must maintain a page table for each machine. This means that current registers must be saved, new register values loaded and the new page table accessed when switching from one page table to another. This process requires several memory access operations and significant delay may be experienced before the requested foreign virtual space can be accessed.

Figure 2:
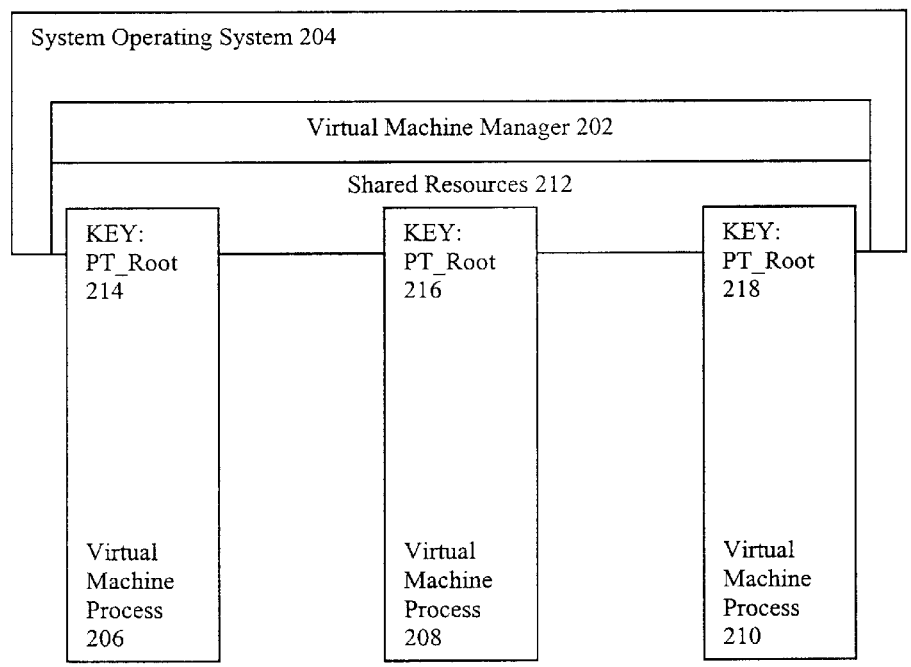
FIG. 2 illustrates a plurality of virtual machines supported by a virtual machine manager.

Referring now to FIG. 2, a virtual machine manager adapted to support multiple page tables in memory is illustrated. Virtual machine manager 202 resides as a subsystem of the support operating system 204 resident in host virtual memory 114. Virtual machine manager 202 is responsible for managing a plurality of foreign virtual memory configurations. Each foreign virtual memory configuration corresponds to a virtual machine. As illustrated in FIG. 2, three virtual machines 206, 208 and 210 are shown. Although a virtual machine may be created or destroyed at any time, a plurality of virtual machines may be supported simultaneously. In the preferred embodiment, each supported foreign virtual memory configuration is isolated from the other existing virtual machines so that each functions as an individual machine.

Virtual machine manager 202 also includes shared resources 212 that are accessed by each virtual machine 206–210. Shared resources include a page table root key 214, 216 and 218 each associated with one of the virtual machines. When the support operating system 204 detects the creation of a new virtual machine by foreign binary code, a new host virtual machine is spawned as part of the binary translation process. Each foreign virtual machine is attached by support operating system 204 to a corresponding host process 206–210 together with a new page table. A heuristic process destroys existing virtual machines on a selective basis. Any existing virtual machine can be safely destroyed because each is fully described by physical memory contents and CPU internal state information. Any previously destroyed virtual machine may be subsequently revived when invoked by the host.

Creation of a virtual machine is initiated upon detection of a request to switch to a virtual machine. Detection is a function of support operating system 204. For example, detection occurs when a page table root address is loaded into a page table register in the foreign computer system. The support operating system recognizes that each page table root address corresponds to one foreign page table, virtual memory space and a virtual machine. When the request is detected, support operating system 204 then determines if the virtual machine already exists. If the virtual machine exists in the foreign virtual memory space, a switch is made to the appropriate page table. If the virtual machine does not already exist, a host process is spawned and a new virtual machine created. Operation of the requested virtual machine may then begin.

Virtual machines are created in a two-step process. First, any virtual machine that is currently operating passes control to virtual machine manager 202. For example, if virtual machines 206 and 208 exist but virtual machine 208 is active, virtual machine 208 passes control to virtual machine manager 202. Upon completion of its task, virtual machine manager 202 then initiates operation of the new virtual machine, which for purpose of illustration may be virtual machine 210. The virtual machine manager maintains host system resources dedicated to each virtual machine. These resources include the CPU register images, physical memory image, hardware emulation image, communication area content, and the current virtual machine's database. Using these resources, the virtual machine manager creates a new virtual machine process by duplicating an existing virtual machine in another portion of memory. This duplication process ensures that the new virtual machine will begin execution using a stable initial image. Of course, the resource image of the new virtual machine will change once execution of the virtual machine begins. In operation, each virtual machine uses support operating system 204 to emulate the foreign system's virtual memory manager.

At any point in time only one virtual machine will be active in a running state. When support operating system 204 detects that a virtual machine has initiated operation, it locates a corresponding host process in host virtual memory. Once located, the host process will begin executing.

While creation of a virtual machine is a function of the foreign binary code, a heuristic process destroys existing virtual machines. This means that support operating system 204 must determine when a virtual machine is obsolete and should be destroyed. The heuristic process operates independently of the foreign computer system and bases the destruction decision on the period of inactivity, the need to free up resources and so on. Advantageously, the heuristic process can destroy virtual machines at any time because there is no information of the virtual memory space stored in the virtual machine. Thus, a virtual machine can be recreated from physical memory upon receipt of the next request to switch to the virtual machine. The one restriction on when the heuristic process determines that a selected virtual machine is to be destroyed is that the virtual machine cannot be active. If the virtual machine is active, support operating system 204 waits for the completion of current task before initiating the destruction of the virtual machine.

The image of all foreign physical memory resides in memory mapped onto foreign virtual memory space. Each virtual machine includes a page table translator that generates memory mapping in the virtual machine memory image using the page table contents. Each page table (associated with virtual machine 206, 208 and 210) is pointed to by its respective page table root address key 214, 216 and 218, respectively.

Figure 3:
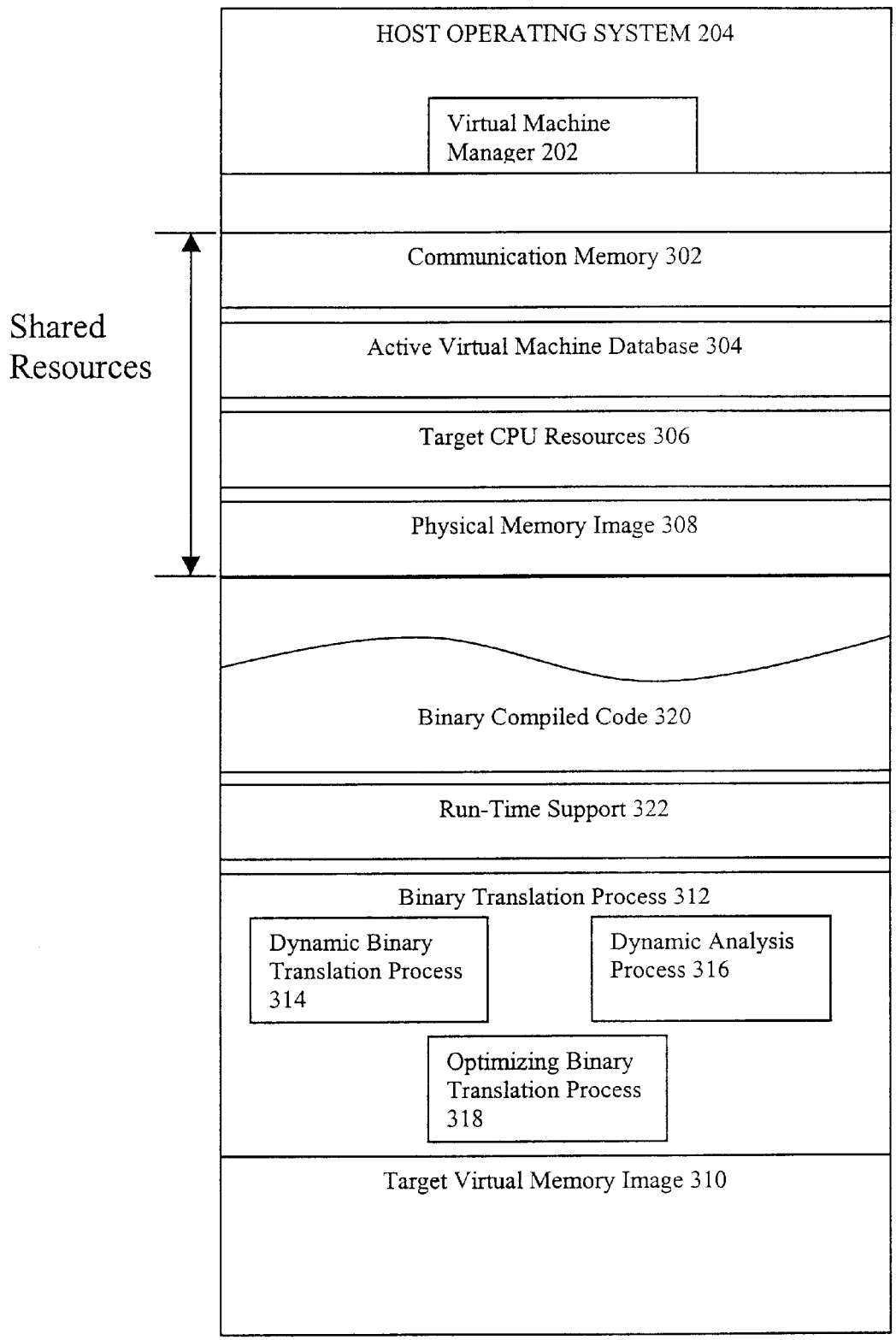
FIG. 3 is a memory map in the host computer system.

Run-time support for the virtual machines is shown in the memory map illustrated in FIG. 3. Run-time support includes procedures and data for performing functions that cannot be compiled in-line by the binary translator into compiled binary code. Run-time support procedures are responsible for execution of complex instructions that the binary compiler may call. By way of example, a complex instruction is the CALL instruction in the x86 environment. Physical memory 108 includes host operating system 204 and a plurality of shared resources that may be invoked by the host process associated by the active virtual machine.

The host process associated with each virtual machine includes means for communicating between virtual machines. More specifically, each virtual machine includes a communication subsystem 302 that facilitates the switching between virtual machines and for handling input and output operations.

An active virtual machine database 304 is used for maintaining previously translated foreign binary code segments. Active virtual memory database 304 is associated with each virtual machine as part of the shared resources.

Each host process associated with each virtual machine further includes a memory protection subsystem to ensure the correct execution of self-modified code and foreign CPU resources 306 as well as protect physical memory image 308 from corruption.

Resources 302–308 may be invoked as needed by virtual machine manager 202 to support the operation of virtual machines 206 and 210. In addition to shared resources, physical memory 108 includes dedicated target virtual memory space 310 of the foreign computer system. Virtual memory space 310 comprises both foreign operating system and foreign application binary code. This code is mapped into allocated memory by a foreign page table (not shown).

Each host process associated with each virtual machine includes dedicated binary translation processes 312. Binary translation processes 312 include a dynamic binary translation process 314 and a dynamic analysis process 316. Dynamic binary translator 314 is used as a fast interpreter of a foreign code for two purposes. First, it enables immediate execution of the foreign code even if there is no pre-existing translated binary code in database 304 and to prepare information for the optimizing binary translator. Second, dynamic binary translator 314 is used in any recovery process for precise interrupt maintenance.

Dynamic analysis process 316 functions like a monitor in the binary translation system. Dynamic analysis process 316 helps not only to control execution of translated binary code, but also to process all exceptions properly, and to invoke optimizing binary translator and provide it with profile information. Dynamic analysis process 316 also includes memory management functions relating to maintaining translated binary code compaction in memory and support coherence with the foreign code. Dynamic analysis process 316 is also responsible for processing special situations during execution of the translated binary code that were not discovered during binary translation. For example, self-modifying code, newly created code and exceptions are all situations that may not be discovered at binary translation time.

All new information collected by the dynamic analysis process 316 is saved for further utilization by optimizing binary translation process 318. Dynamic binary translation process 314 and optimizing binary translation process 318 execute in parallel. As binary translator process 318 translates foreign code in optimized mode, dynamic binary translator 314 translates the code in a fast simple mode. When optimized translated binary code is ready, the control switches over to the optimized code at a coherent point for execution.

Typically, an entire sector of the code is transferred from a disk drive to the target virtual memory image 310 portion of physical memory 108 in a single operation. During the transfer process, computer system 100 uses low-level code correspondence checking during the runtime binary translation process where a sequence of low-level code is a sequence of basic machine operations. Each sequence is translated using optimizing binary translation process 318, dynamic binary translation process 314 and dynamic analysis process 316 in order to obtain optimal performance when executed by host computer system 100. Each host process associated with each virtual machine includes binary compiled code in memory region 320 in host virtual memory space. As soon as binary compiled code corresponding to the foreign code is present in memory region 320 of physical memory 108, the virtual machine is ready to execute.

Each host process associated with each virtual machine includes binary compilation run-time support. Run time support module 322 maintains a linear foreign page table and then uses memory management calls by the host operating system to map pages from physical memory image object to appropriate places in part of the process address space devoted to holding the image of virtual memory for the foreign virtual machine.

Figure 4:
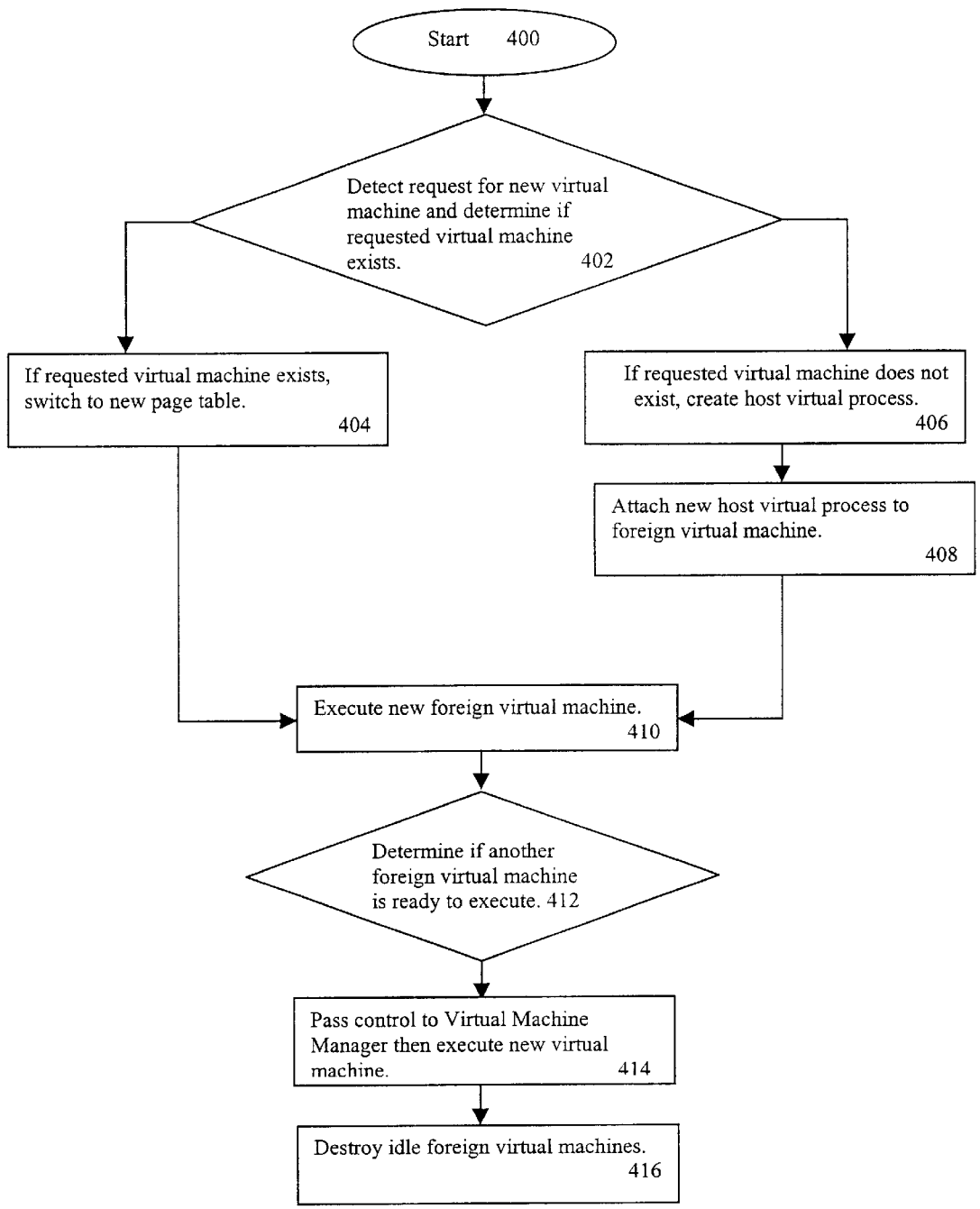
FIG. 4 shows a process flow for creation and management of virtual machines in accordance with the present invention.

Referring now to FIG. 4, a flow diagram for the creation and management of virtual machines is illustrated. A virtual machine is created upon creation of a new page table in foreign virtual space. When the request for the page table is detected, the host computer determines whether the page table already exists in step 402. If the virtual machine exists in the foreign virtual memory space, a switch is made to the appropriate page table as indicated at step 404. If the virtual machine does not already exist, a host process is spawned and a new virtual machine created as indicated at step 406. The new host virtual machine is defined by copying an existing virtual machine. In step 408, the new foreign virtual machine is then attached to its corresponding host process together with a new host page table. Operation of the requested virtual machine may then begin as indicated at step 410.

If a plurality of virtual machines exist, system resources are made available to the active machine. Thus, the support operating system must detect when a new foreign virtual machine is trying to execute, as indicated at step 412. If another virtual machine becomes active, control must first pass to virtual machine manager before the next virtual machine can initiate operation as indicated at step 414. At any point in time only one virtual machine will be active in a running state. While creation of a virtual machine is a function of the foreign binary code, a heuristic process implemented in host code destroys existing virtual machines as indicated at step 416. If the virtual machine is active, support operating system waits for the completion of current task before initiating the destruction of the virtual machine.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

What is claimed is:

1. A host computer system adapted to translate foreign binary code for execution, where said host computer system is architecturally distinct from a foreign architecture capable of executing said foreign binary code, said host computer system comprising:

a foreign virtual memory space for maintaining a virtual machine;

a host virtual memory space for maintaining host processes associated with said virtual machine;

means for detecting a change in said foreign virtual memory space to denote the creation of at least one additional virtual machine in said foreign virtual memory space; and means for establishing a host process associated with said at least one additional virtual machine.

2. The computer system of claim 1 further comprising means for destroying said virtual machine.

3. The computer system of claim 1 further comprising means for destroying said at least one additional virtual machine.

4. The computer system of claim 1 wherein said detecting means comprises a binary translation process adapted to detect a change in the configuration of said host virtual memory space.

5. The computer system of claim 4 wherein said detecting means further comprises means for creating a host process, said host process associated with a virtual machine defined in said foreign virtual memory space.

6. The computer system of claim 4 further comprising:

a random access memory; and means for maintaining an image of a foreign virtual machine in said random access memory, wherein said foreign virtual machine is represented as a linear space of said host virtual memory.

7. The computer system of claim 6 wherein said detecting means further comprises means for creating a host process, said host process associated with a virtual machine defined in said foreign virtual memory space where said host process and said foreign virtual machine are maintained in said random access memory.

8. The computer system of claim 7 wherein said host process associated with a virtual machine comprises binary translation processes and code produced by said binary translation process; said code corresponding to said virtual machine.

9. In a computer system for translating foreign binary code for execution on a host computer system, a method for maintaining a plurality of virtual machines comprising the steps of:

defining a foreign virtual memory space for maintaining a virtual machine;

defining a host virtual memory space for maintaining host processes associated with said virtual machine;

detecting a change in said foreign virtual memory space to denote the creation of at least one additional virtual machine in said foreign virtual memory space; and establishing a host process associated with said at least one additional virtual machine.

10. The method of claim 9 further comprising the step of selectively destroying said virtual machine.

11. The method of claim 9 further comprising the step of destroying said at least one additional virtual machine.

12. The method of claim 9 further comprising the step of detecting a change in the configuration of said host virtual memory space.

13. The method of claim 12 further comprising the step of creating a host process, said host process associated with a virtual machine defined in said foreign virtual memory space.

14. The method of claim 13 further comprising the step of maintaining an image of a foreign virtual machine, said foreign virtual machine represented as a logical linear space.

15. The method of claim 14 further comprising the step of creating a host process, said host process associated with a virtual machine defined in said foreign virtual memory space where said host process and said foreign virtual machine are maintained in a random access memory.

16. The method of claim 15 further comprising the step of generating binary translated code, said binary translated code corresponding to said virtual machine.

17. A host computer system adapted to translate foreign binary code for execution, where said host computer system is architecturally distinct from the foreign architecture capable of executing said translated foreign binary code, said host computer system comprising:

a foreign virtual memory space for maintaining a plurality of virtual machines, each of said virtual machines implemented in foreign binary code;

a host virtual memory space for maintaining a plurality of host processes;

a virtual machine manager for selectively allocating host computer system resources to each of said plurality of host processes.

18. The computer system of claim 17 wherein said virtual machine manager further comprises means for associating each of said plurality of host processes with a corresponding one of said plurality of virtual machines.

19. The computer system of claim 18 wherein said virtual machine manager further comprises means for selecting one of a plurality of page tables, each of said plurality of page tables associated with one of said plurality of virtual machines.

20. The computer system of claim 18 wherein said virtual machine manager further comprises means for destroying at least one of said plurality of virtual machines.

21. The computer system of claim 17 further comprising a host operating system for providing system level functions and for interfacing said virtual machine manager to system resources.

22. The computer system of claim 21 wherein said virtual machine manager comprises a module of said host operating system.

* * * * *